(12) United States Patent
Goyal et al.

(10) Patent No.: US 12,299,419 B2
(45) Date of Patent: May 13, 2025

(54) UNIFIED FRAMEWORK FOR CONFIGURATION AND DEPLOYMENT OF PLATFORM INTELLIGENCE

(71) Applicant: ServiceNow, Inc., Santa Clara, CA (US)

(72) Inventors: Gaurav Goyal, Santa Clara, CA (US); Prashanti Nilayam, Santa Clara, CA (US); Wenhua Li, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 74 days.

(21) Appl. No.: 18/101,949

(22) Filed: Jan. 26, 2023

(65) Prior Publication Data

US 2024/0256232 A1    Aug. 1, 2024

(51) Int. Cl.
*G06F 8/35*    (2018.01)
*G06F 8/71*    (2018.01)

(52) U.S. Cl.
CPC . *G06F 8/35* (2013.01); *G06F 8/71* (2013.01)

(58) Field of Classification Search
CPC ................. G06F 8/35; G06F 8/71; G06F 8/30
USPC ........................................................ 717/105
See application file for complete search history.

(56) References Cited

U.S. PATENT DOCUMENTS

| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |

(Continued)

FOREIGN PATENT DOCUMENTS

| CA | 3099575 A1 * | 9/2021 | ............... G06F 8/10 |
| EP | 0433979 | 6/1991 | |

(Continued)

OTHER PUBLICATIONS

CA_3099575_A1_I, English text Foreign Patent Document CA-3099575-A1 (Year: 2021).*

(Continued)

*Primary Examiner* — Thuy Dao
*Assistant Examiner* — Zengpu We
(74) *Attorney, Agent, or Firm* — McDonnell Boehnen Hulbert & Berghoff LLP

(57) ABSTRACT

A method includes determining a definition of a capability, where the definition indicates an input, an output, and an operation performed by the capability on the input to generate the output. The method also includes determining models configured to provide the capability, providing the definition of the capability to an application builder configured to provide a model-independent representation of the capability, and determining a mapping that indicates, for each respective model of the models, one or more attribute values that cause the respective model to be executed to provide at runtime the capability to a software application defined using the application builder, where the mapping is unmodifiable by the application builder. The method further includes, in response to reception from the software application of a request to provide the capability, providing the capability to the software application in accordance with the mapping.

20 Claims, 10 Drawing Sheets

(56) References Cited

U.S. PATENT DOCUMENTS

| | | |
|---|---|---|
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2016/0070542 A1* | 3/2016 | Vadapandeshwara .... G06F 8/34 717/163 |
| 2018/0123940 A1 | 5/2018 | Rimar et al. |
| 2019/0104398 A1 | 4/2019 | Owen et al. |
| 2020/0050689 A1 | 2/2020 | Tal et al. |
| 2020/0204443 A1 | 6/2020 | Bar Oz et al. |
| 2020/0401382 A1* | 12/2020 | Briggs ...................... G06F 8/35 |
| 2021/0019665 A1 | 1/2021 | Gur |
| 2021/0055915 A1 | 2/2021 | Guo et al. |
| 2021/0194764 A1 | 6/2021 | Badyan et al. |
| 2021/0256000 A1* | 8/2021 | Von Niederhausern ..................... G06F 16/90335 |
| 2022/0029886 A1 | 1/2022 | Hameiri et al. |
| 2023/0195431 A1* | 6/2023 | Duggal ..................... G06F 8/35 717/104 |
| 2024/0111843 A1* | 4/2024 | Samudrala .......... G06F 21/1075 |

FOREIGN PATENT DOCUMENTS

| | | |
|---|---|---|
| EP | 1607824 | 12/2005 |
| JP | 2022545036 A | 10/2022 |
| JP | 7170157 B1 | 11/2022 |
| WO | WO 99/34285 | 7/1999 |
| WO | WO 00/52559 | 9/2000 |
| WO | WO 01/79970 | 10/2001 |
| WO | WO-2016156974 A1 * | 10/2016 ......... G06F 3/04842 |

OTHER PUBLICATIONS

WO_2016156974_A1_I, English Foreign Patent Document WO-2016156974-A1 (Year: 2016).*

"Bring AI to your apps with AI Builder," AI Builder—AI Templates for Apps / Microsoft Power Apps, printed from the World Wide Web Jan. 26, 2023, https://power apps.microsoft.com/en-us/ai-bulder/.

Dominick Rocco, "What is a Model Registry?", Mar. 3, 2022 (Mar. 3, 2022), pp. 1-9, Retrieved from the Internet: URL:https://www.phdata.io/blog/what-is-a-model-registry/.

(56) References Cited

OTHER PUBLICATIONS

Extended European Search Report, European Patent Application No. 24152720.9, mailed Jun. 10, 2024.
Wikipedia, "Adapter pattern", May 31, 2022 (May 31, 2022), pp. 1-11, Retrieved from the Internet: URL:https://en.wikipedia.org/w/index.php?title=Adapter_pattern&oldid=1090799086.

* cited by examiner

UNIFIED FRAMEWORK FOR CONFIGURATION AND DEPLOYMENT OF PLATFORM INTELLIGENCE

BACKGROUND

Developing software applications that utilize machine learning models and/or other types of models may involve understanding how such models operate in order to allow these models to be implemented as part of the software applications. Implementing an application-specific version of a model as part of a software application, and/or integrating an existing model as part of the software application, may be a programming-intensive and/or time-consuming process, and may thus increase the amount of effort and/or time involved in developing the software application. Accordingly, even when various models are readily available, model selection, development, and/or integration may pose challenges that delay or impede utilization of these models, especially by low-code and/or no-code software developers.

SUMMARY

Utilization of various models by software developers may be facilitated by providing a model integration layer that standardizes the manner in which software applications utilize these models. The model integration layer may form a framework that facilitates interconnection of the models and the software applications. The model integration layer may provide a plurality of capabilities for integration into software applications, including software applications developed using low-code and/or no-code application builders. Each capability may be provided by a plurality of models, but these models, their specific implementation details, and/or selection process may be hidden from the software application builders and/or the software applications. Thus, the software application builders may be configured to utilize model-independent representations of the capabilities. The representation of a particular capability may include one or more inputs thereof, one or more outputs thereof, and a description of an operation performed on the inputs to generate the outputs, but might not include details about the underlying models.

The model integration layer may allow software applications to provide input data in a capability-specific format, and generate output data in a capability-specific format, each of which may be standardized and kept constant over time. When these capability-specific data formats differ from corresponding model-specific data formats utilized by the models selected to provide the capabilities, the model integration layer may be configured to perform a transformation between the capability-specific formats and the model-specific formats, and vice versa, to provide the software application with the appearance of a model-independent execution of the capability.

The model integration layer may also include a mapping that conditions model selection on one or more attribute values determined at runtime. These runtime attribute values may be indicative of properties of the software application, the software application builder, the model integration layer, the models, and/or the computing systems that provide the models. Model selection based on the runtime attribute values may allow the model integration layer to perform model selection based on considerations of, for example, model accuracy, model computational complexity, current capability/model demand (i.e., system processing load), quality of service expected by the software application, and/or other conditions present a runtime. The mapping may be modifiable by way of the model integration layer without affecting the software applications' ability to utilize the capabilities.

Thus, although each software application may interact with a given capability in a standardized manner, the mapping may allow the capability to deliver the output data with varying degrees of accuracy, latency, computational resource utilization, and/or other performance parameters. Further, software applications may continue to use the same capability even as the specific set of models configured to provide the capability changes over time, thus allowing modifications to be made at the model integration layer without significantly affecting the software applications. By allowing such modifications to be made at the model integration layer, software developers may be able to add, modify, and/or replace the models without affecting the standardized capability interfaces, and thus without necessitating action on the part of the low-code and/or no-code developers that utilize the capabilities by way of the software application builders.

Accordingly, a first example embodiment may involve determining a definition of a capability. The definition may indicate an input for the capability, an output of the capability, and an operation performed by the capability on the input to generate the output. The first example embodiment may also involve determining a plurality of models configured to provide the capability, and providing the definition of the capability to an application builder configured to provide a model-independent representation of the capability. The first example embodiment may additionally involve determining a mapping that indicates, for each respective model of the plurality of models, one or more attribute values that cause the respective model to be executed to provide at runtime the capability to a software application defined using the application builder. The mapping may be unmodifiable by the application builder. The first example embodiment may further involve, in response to reception from the software application of a request to provide the capability, providing the capability to the software application in accordance with the mapping.

A second example embodiment may involve receiving, from a software application, a request to provide a capability to the software application. The request may include an input data for the capability. The capability may be configured to perform an operation on the input data to generate an output data. The software application may have been defined using an application builder configured to provide a model-independent representation of the capability for integration into the software application. The second example embodiment may also involve, in response to reception of the request to provide the capability, determining at least one runtime attribute value associated with the software application, and selecting, based on the at least one runtime attribute value and a mapping, a first model from a plurality of models configured to provide the capability. The mapping may indicate, for each respective model of the plurality of models, one or more attribute values that cause the respective model to be executed to provide at runtime the capability to the software application. The mapping may be unmodifiable by the application builder. The second example embodiment may additionally involve causing the first model to process the input data received from the software application, receiving, from the first model, the output data, and providing, to the software application, a model-independent representation of the output data.

A third example embodiment may involve a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
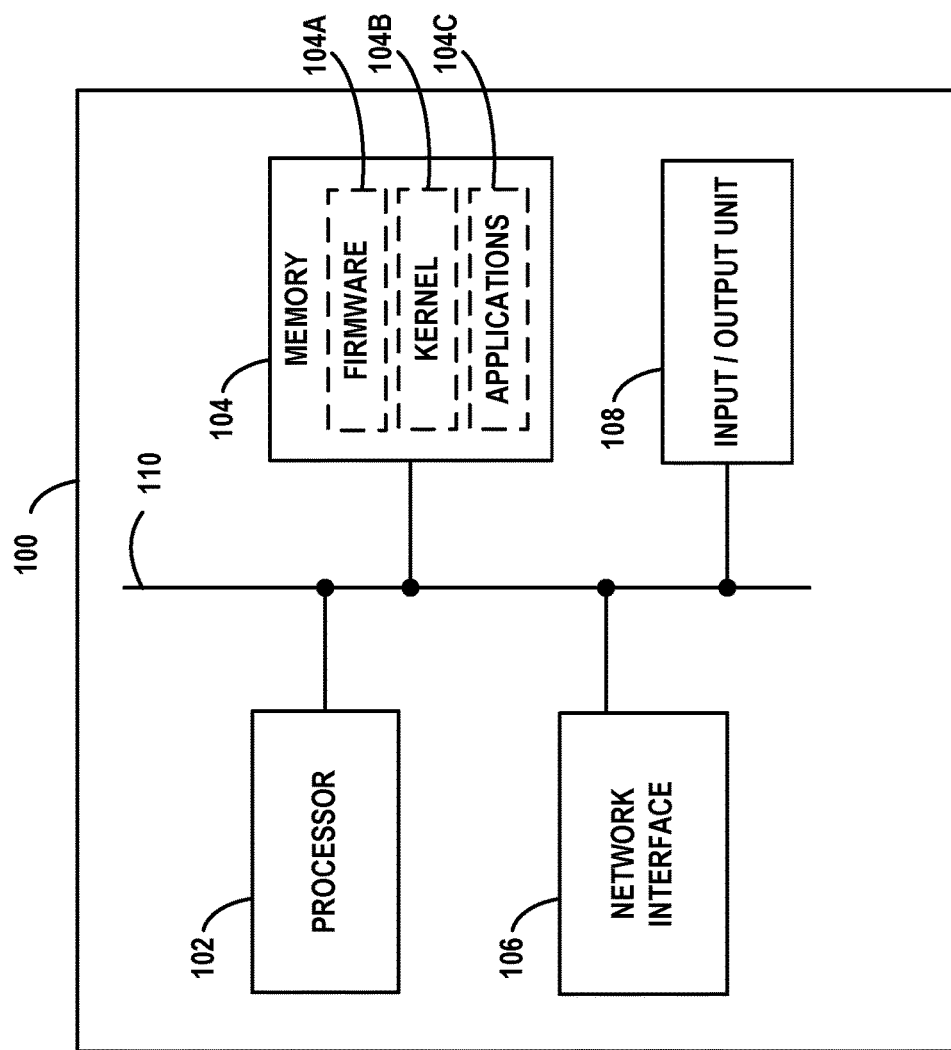
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
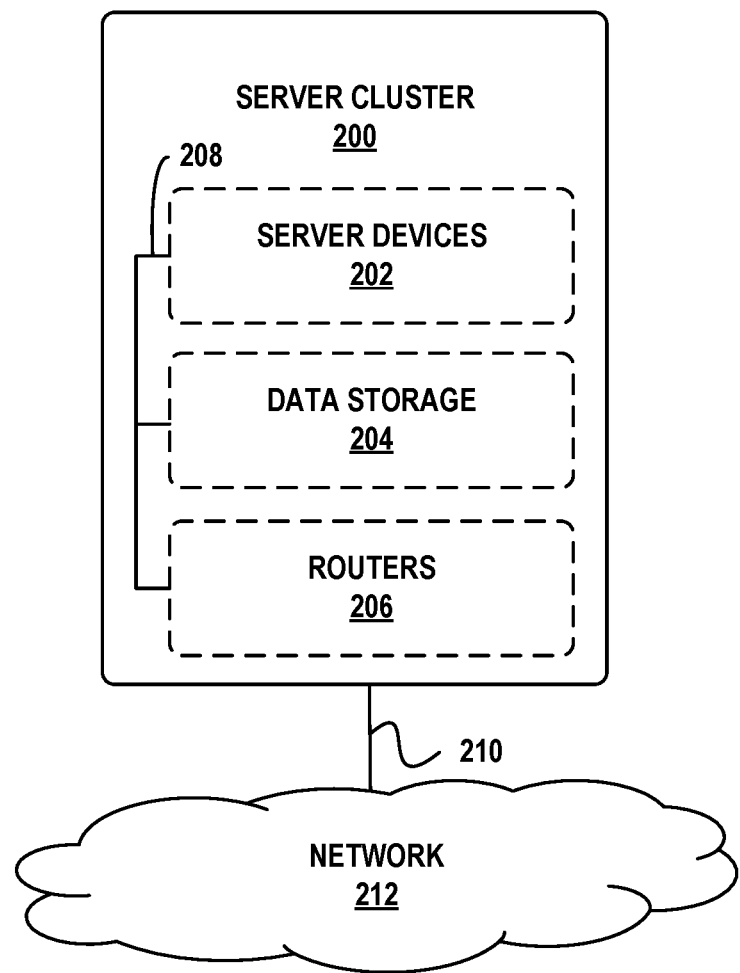
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
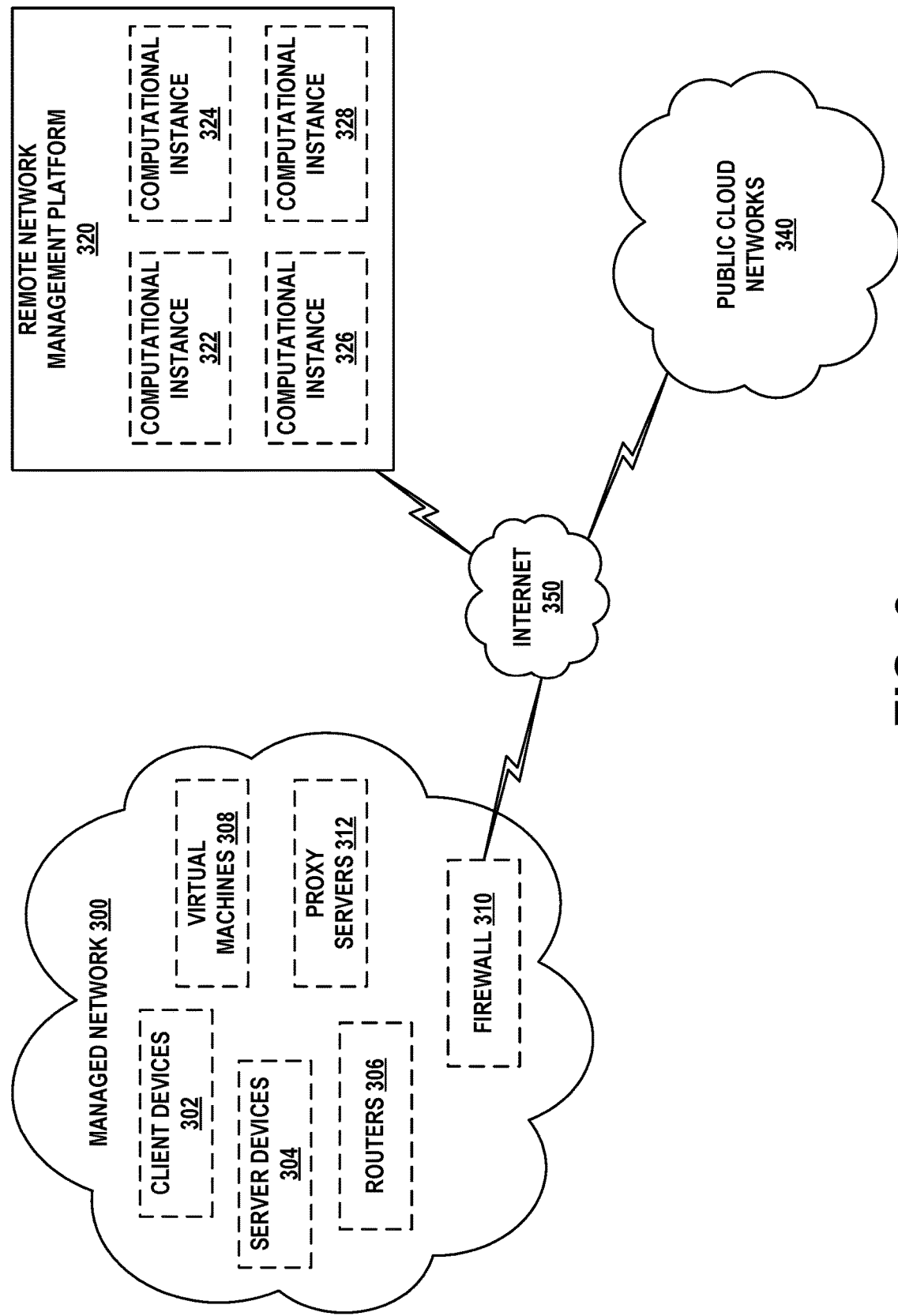
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below)

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
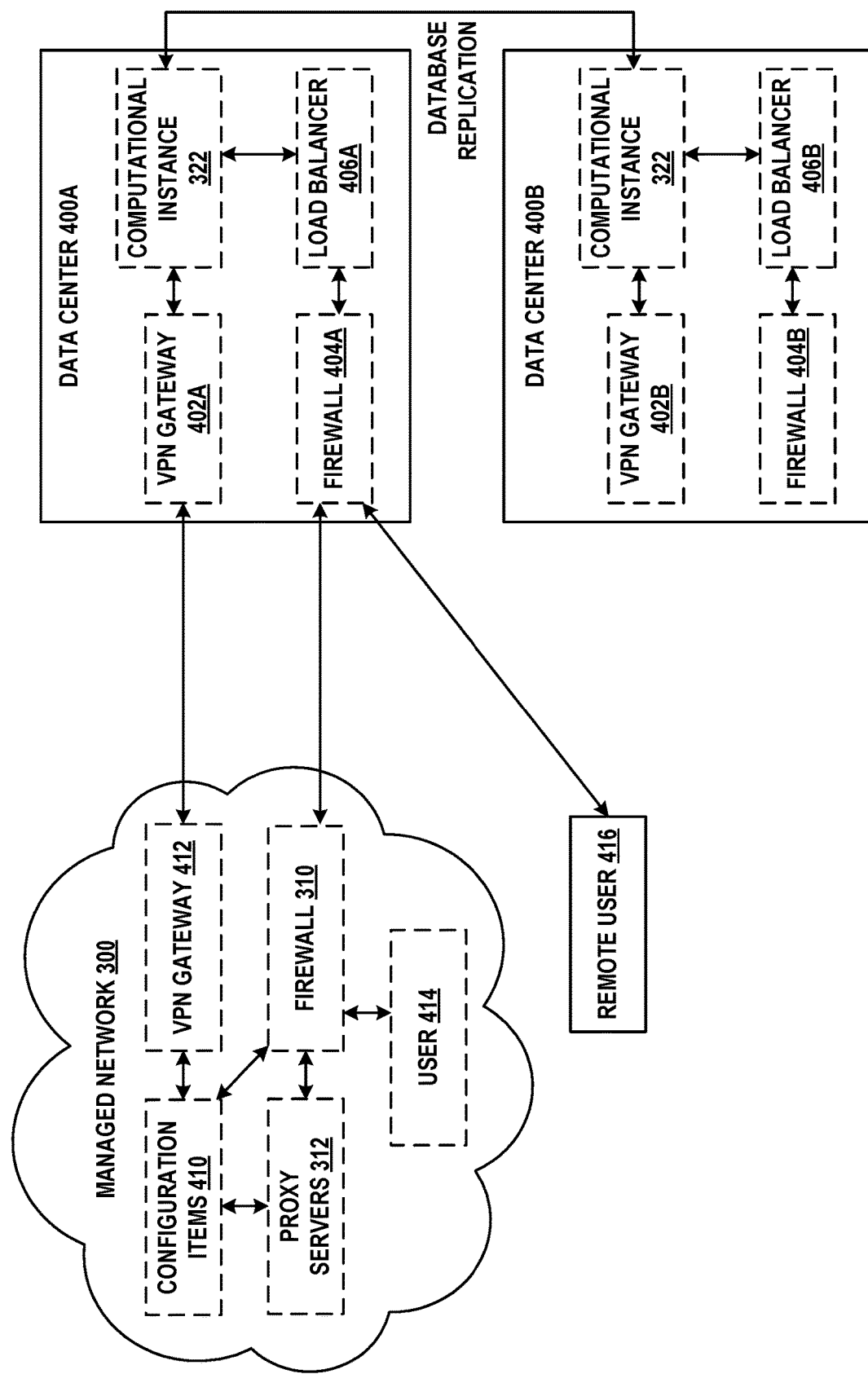
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
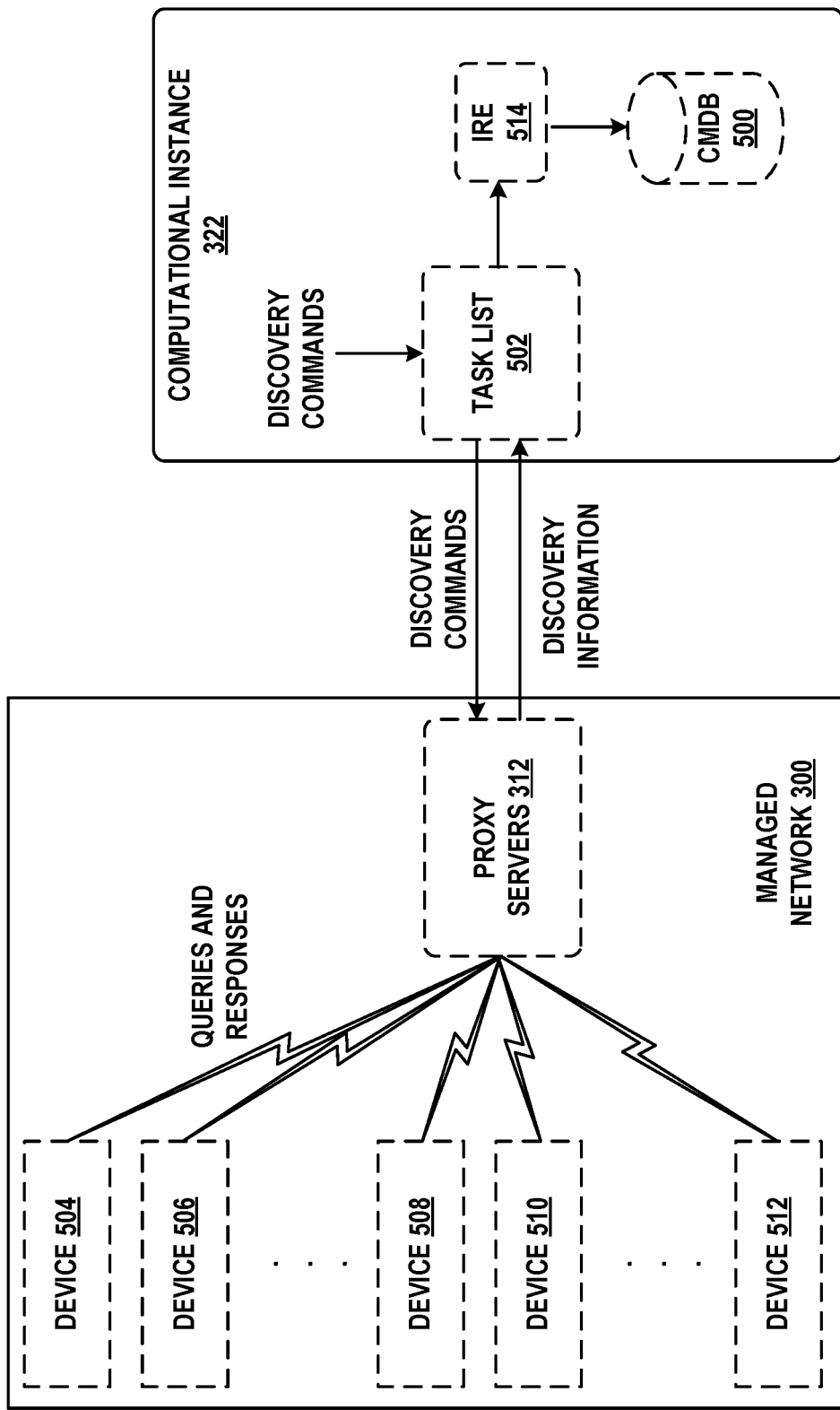
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device.

For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. EXAMPLE MODEL INTEGRATION LAYER

Figure 6:
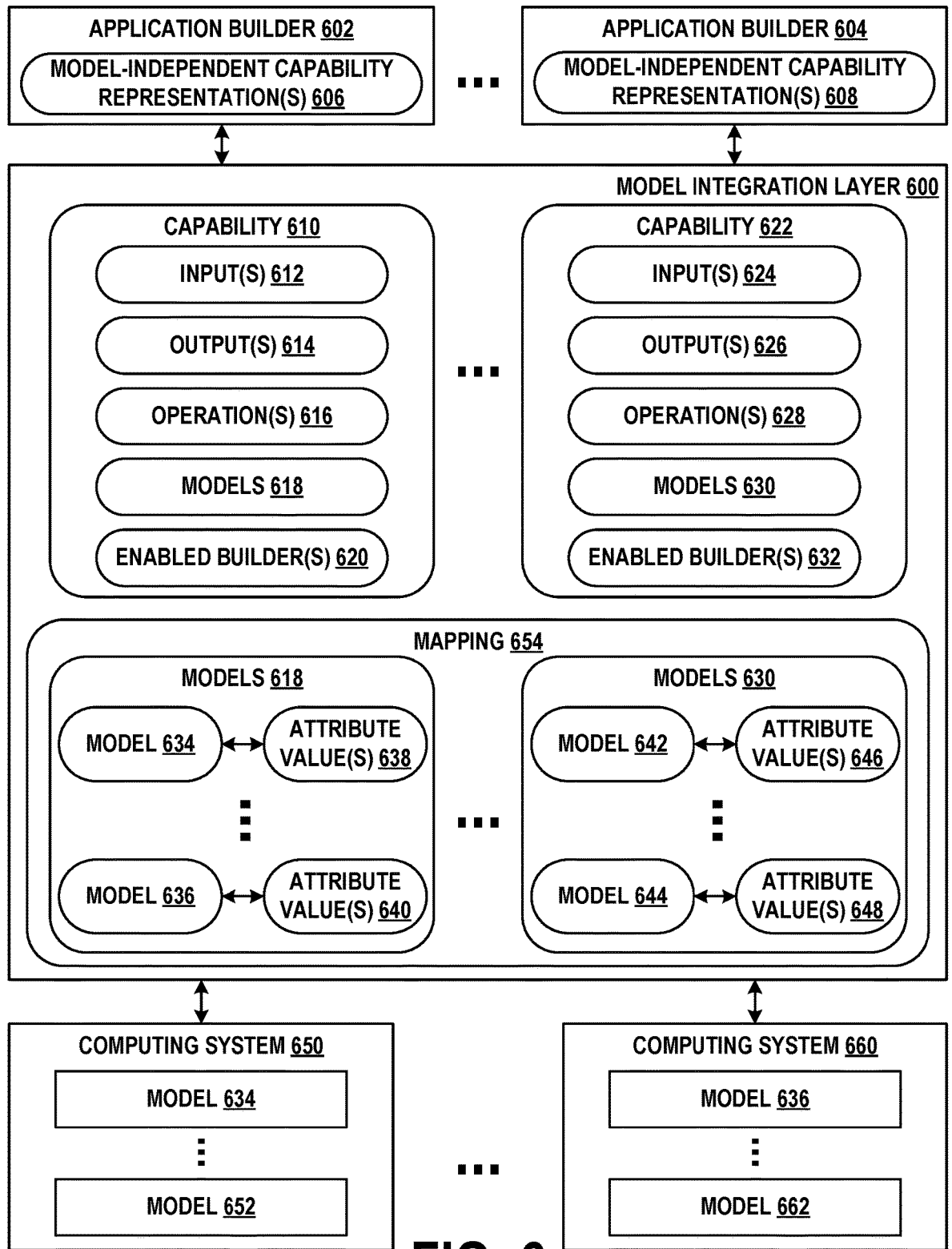
FIG. 6 depicts a model integration layer, in accordance with example embodiments.

FIG. 6 illustrates an example model integration layer 600 configured to facilitate integration of a plurality of different capabilities into software applications developed using one or more application builders. Specifically, model integration layer 600 may provide capability 610 through capability 622 (i.e., capabilities 610-622) to application builder 602 through application builder 604 (i.e., application builders 602-604). Capabilities 610-622 may be executed on behalf of model integration layer 600 by computing system 650 through computing system 660 (i.e., computing systems 650-660). Thus, model integration layer 600 may provide an interface between application builders 602-604 and computing systems 650-660, and this interface may be standardized to facilitate usage of capabilities 610-622 by software application developed using application builders 602-604.

Each respective application builder of application builders 602-604 may provide a graphical user interface for defining software applications. The graphical user interface may include a plurality of graphical components that represent various operations, and these graphical components may be draggable, clickable, interconnectable, and/or otherwise modifiable by way of the user interface to allow the software applications to be defined using low-code and/or no-code user interface manipulations. Each respective graphical component of the plurality of components may represent corresponding source code. The corresponding source code might not be explicitly shown as text, and may instead be graphically summarized by a corresponding icon to facilitate low-code and/or no-code implementations of the software applications. In some cases, the respective application builder may be specific to a particular type and/or class of software application, such as a desktop application, a mobile application, and/or a virtual assistant application, among other possibilities.

Model integration layer 600 may allow capabilities 610-622 to be shared by application builders 602-604 without necessitating separate implementations by application builders 602-604 and/or by the software application developed thereby. Each respective capability of capabilities 610-622 may include a corresponding input, a corresponding output, a corresponding operation performed on the corresponding input to generate the corresponding output, one or more corresponding models configured to perform the corresponding operation, and a corresponding indication of the builders for which the respective capability in enabled. For example, capability 610 may include input(s) 612, output(s) 614, operation(s) 616, models 618, and enabled builder(s) 620. Capability 622 may include input(s) 624, output(s) 626, operation(s) 628, models 630, and enabled builder(s) 632.

Input(s) 612-624 may define a format, structure, data type, and/or a size/length of input data expected by capabilities 610-622, respectively. Outputs(s) 614-626 may define a format, structure, data type, and/or a size/length of output data generated by capabilities 610-622, respectively. Operation(s) 616-628 may represent function(s), transformation(s), and/or modification(s) applied by capabilities 610-622, respectively. Models 618-630 may represent specific software and/or hardware structures configured to carry out operation(s) 616-628, respectively, to provide capabilities 610-622, respectively. In some implementations, some or all of models 618-630 may be implemented as machine learning models, such as artificial neural networks that have been trained to provide the corresponding operations. Enabled builder(s) 620-632 may indicate whether capabilities 610-622, respectively, are enabled for use in a given application builder of applications builders 602-604.

Each respective capability of capabilities 610-622 may be implemented using a corresponding plurality of models. For example, capability 610 may be implemented using models 618, and capability 622 may be implemented using models 630. Each application builder of application builders 602-604 may be configured to provide model-independent representations of capabilities 610-622. For example, application builder 602 may be configured to provide model-independent capability representation(s) 606 of a first subset of capabilities 610-622 that is enabled for application builder 602. Application builder 604 may be configured to provide model-independent capability representation(s) 608 of a second subset of capabilities 610-622 that is enabled for application builder 604. Model-independent capability representation(s) 606-608 may represent capabilities 610-622, but might not provide a description of the details of the underlying models that are executed to provide capabilities 610-622. For example, model-independent capability representation(s) 606-608 might not list and/or describe models 618 and 630. Model-independent capability representation(s) 606-608 may thus facilitate low-code and/or no-code application development by omitting low-level implementations details of the models that provide capabilities 610-622.

Mapping 654 may define conditions under which a given model is executed to provide a corresponding capability. Specifically, mapping 654 may indicate, for each respective model utilized by model integration layer 600, one or more attribute values that, if present at runtime, are configured to cause the respective model to be executed to provide the corresponding capability. Since each respective capability of capabilities 610-622 may be implemented using a corresponding plurality of models, mapping 654 may indicate how these models are to be used, individually and/or in combination, to generate output data for the respective capability.

For example, models 618 that provide capability 610 may include model 634 through model 636 (i.e., models 634-636). Model 634 may be executed when attribute value(s) 638 are determined at runtime, model 636 may be executed when attribute value(s) 640 are determined at runtime, and other ones of models 618 (as indicated by the ellipsis) may be executed when other corresponding attribute value(s) (as indicated by the ellipsis) are determined at runtime. Models 630 that provide capability 622 may include model 642 through model 644 (i.e., models 642-644). Model 642 may be executed when attribute value(s) 646 are determined at runtime, model 644 may be executed when attribute value(s) 648 are determined at runtime, and other ones of models 630 (as indicated by the ellipsis) may be executed when other corresponding attribute value(s) (as indicated by the ellipsis) are determined at runtime.

Models 618-630 may be hosted by computing systems 650-660. Specifically, computing system 650 may host model 634 through model 652 (i.e., models 634-652), and computing system 660 may host model 636 through model 662 (i.e., models 636-662). Models 634-652 and 636-662 may be distributed among computing system 650-660 in a capability-independent manner. That is, models 634-652 of computing system 650 may be configured to provide a plurality of different capabilities, rather than a single capability. Thus, model 634, which provides capability 610, may be provided by computing system 650, while model 636, which also provides capability 610, may be provided by computing system 660.

In some implementations, at least one of computing systems 650-660 may reside in a same network as model integration layer 600. For example, model integration layer 600 may be hosted by remote network management platform 320 and/or a computational instance thereof. Model integration layer 600 may thus be configured to facilitate integration of existing in-network models into software applications. In other implementations, one or more of computing systems 650-660 may reside in a different network from model integration layer 600. For example, the one or more of computing systems 650-660 may represent third-party computing systems (e.g., managed networks 300 or public cloud networks 340) that provide one or more corresponding models (which may be proprietary or open source) for execution. Model integration layer 600 may thus be configured to facilitate integration of existing third-party models into software applications. Accordingly, model integration layer 600 may allow software applications to utilize both existing in-network models and existing third-party models without necessitating independent implementation and/or re-implementation of such models, thus significantly speeding up the software development process.

In some implementations, attribute value(s) 638-640 may be mutually exclusive, and thus capability 610 may be provided at runtime by selecting one model from models 618. Accordingly, the output data of capability 610 may be equal to the output data of the selected model. In other implementations, attribute value(s) 638-640 may be overlapping, and thus capability 610 may be provided at runtime by selecting one or more models from models 618. For example, a plurality of models may be selected, and each model may be configured to process the input data to generate corresponding output data. The plurality of selected models may form an ensemble. Model integration layer 600 may be configured to combine (e.g., determine an average, median, minimum, maximum, etc.) the corresponding output data of each model of the ensemble to generate final output data, which model integration layer 600 may provide to the software application. Similarly, attribute value(s) 646-648 may be mutually exclusive or overlapping.

Mapping 654 may be modifiable by way of a user interface provided by model integration layer 600. However, mapping 654 might not be modifiable by and/or visible to application builders 602-604. Thus, application builders 602-604, and software applications developed thereby, may be configured to request capabilities 610-622, but might not be able to control how these capabilities are provided. That is, application builders 602-604, and software applications developed thereby, might not be able to select the specific models that are executed to provide capabilities 610-622, and may instead rely on model integration layer 600 to perform the model selection. By relying on standardized, model-agnostic, and temporally-constant representations of capabilities 610-622 in combination with modifiable mapping 654, model integration layer 600 may allow model updated to be implemented at model integration layer 600 without necessitating performance of any modifications at the software application builders and/or the software applications.

Attribute value(s) 638-640 and/or attribute value(s) 646-648 may represent values of a plurality of different attributes, including various parameters and/or variables determinable at runtime. The attributes may be associated with the software application requesting a capability, with the application builder used to define the software application, with model integration layer 600, and/or with computing systems 650-660. Thus, model integration layer 600 may use mapping 654 to condition model selection on a plurality of different variables, each of which may be determinable by model integration layer 600 at runtime. Each set of attribute value(s) 638-640 and 646-648 may represent various linear and/or non-linear combinations of values of a plurality of different attributes.

As one example, the attributes may include one or more capability request source identifiers, such as an identifier of the software application, an identifier of a user of the software application, an identifier of the application builder that has been used to define the software application, and/or an identifier of a geographic location associated with the software application. Thus, capability 610 may be provided by different ones of models 618, depending on the source identifiers associated with the request for capability 610, with mapping 654 indicating which model is to be used for a particular combination of one or more source identifiers.

As another example, the attributes may represent a quality of service, such as a quality of service level, a target latency, and/or a target accuracy associated with the software application and/or the application builder that has been used to define the software application. Thus, for example, capability 610 may be provided by model 634 (which might be smaller, and/or parallelizable) when the output data is expected to be received by the software application with low latency, and capability 610 may be provided by model 636 (which might be larger, and/or executed serially) when the output data is expected to be received by the software application with higher latency. Accordingly, for at least some of capabilities 610-622, the models that provide a respective capability may vary in size, accuracy, latency, and/or underlying hardware, and may thus differ in accuracy of results, execution speed, and/or utilization of computing resources, among other properties.

As a further example, the attributes may represent a utilization of computing resources at runtime, including computing resources of model integration layer 600 and/or computing systems 650-660. Thus, model integration layer 600 may be configured to load balance requests for a given capability across the plurality of models configured to provide that capability. For example, model integration layer 600 may be configured to distribute requests for capability 622 across models 630 using a round robin assignment, least connection assignment, resource-based assignment, hash-based assignment, and/or weighted variations thereof, among other possibilities. Alternatively or additionally, model integration layer 600 may be configured to load balance requests for different capabilities across computing systems 650-660, such that the models and/or computing resources of different computing systems are utilized approximately and/or substantially equally and/or without overloading any single computing system.

As a yet further example, the attributes may include input data that is model-specific. For example, the input data for a given capability of capabilities 610-622 may include one or more required inputs and zero or more optional inputs. A first subset of the models for the given capability may be configured to process only the required inputs, while a second subset of the models for the given capability may be configured to process both the required inputs and the optional inputs. Thus, when at least one optional input is provided at runtime, mapping 654 may be configured to cause selection of a model from the second subset, such that the selected model can consider any required inputs and the at least one optional input in generating the output data.

In some implementations, the inputs and/or outputs of different models for a given capability may vary. Accordingly, in order to provide a standardized interface for the given capability, model integration layer 600 may be configured to (i) transform standardized capability-specific inputs for the given capability into model-specific inputs for a selected model, and (ii) transform model-specific outputs from the selected model into standardized capability-specific outputs for the capability. That is, model integration layer 600 may be configured to modify formatting of the input data and/or output data such that any model-specific variations are not apparent to application builders 602-604 and/or the software applications developed thereby.

VII. EXAMPLE CAPABILITY DEFINITION AND EXECUTION

Figure 7A:
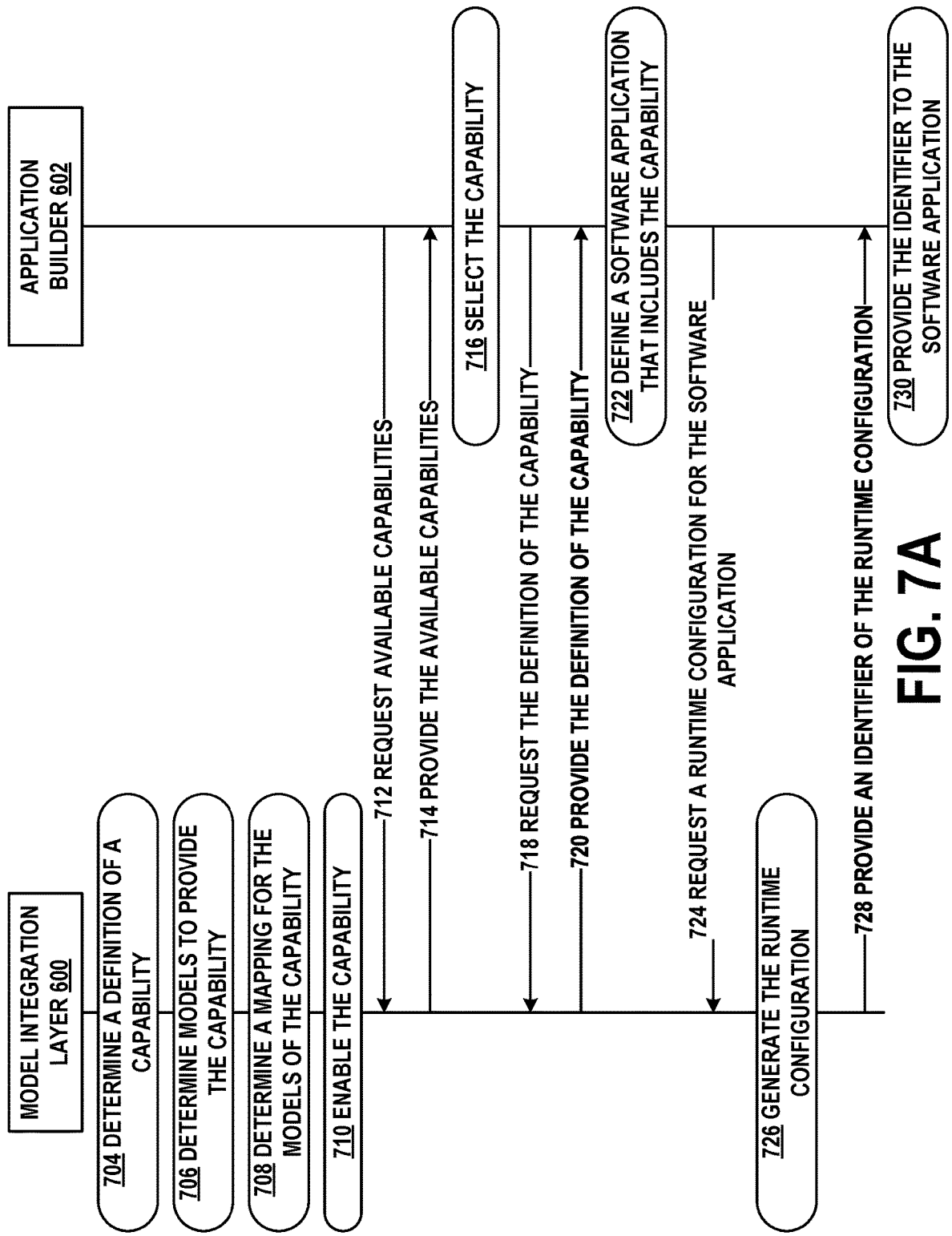
FIGS. 7A and 7B depict a message flow diagram, in accordance with example embodiments.
Figure 7B:
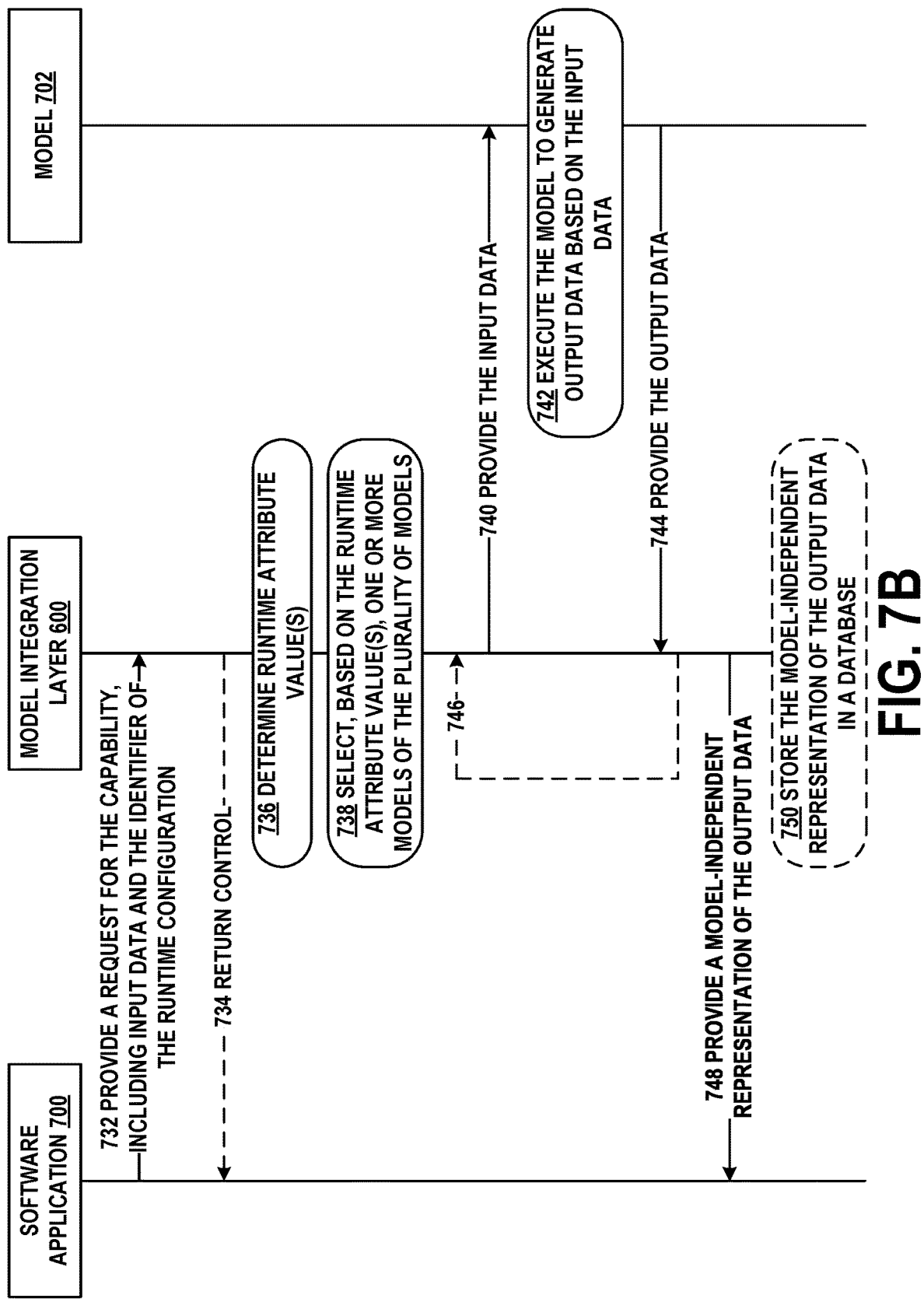

FIG. 7A illustrates a message flow diagram of operations related to definition of a capability provided by model integration layer 600, and 7B illustrates a message flow diagram of operations related to execution of the capability. FIG. 7A illustrates application builder 602 as a representative example of application builders 602-604, and FIG. 7B illustrates model 702 as a representative example of models 618-630.

Turning to FIG. 7A, model integration layer 600 may be configured to determine a definition of a capability, as indicted by block 704. The definition of the capability may include as least the input(s) of the capability, the output(s) of the capability, and the operation(s) performed on the input(s) to generate the output(s). The input(s) may be associated with a capability-specific input data format, and/or the output(s) may be associated with a capability-specific output data format. The definition of the capability may be stored in a database associated with model integration layer 600 to keep track of the capabilities available by way of model integration layer 600.

Based on and/or in response to determining the definition of the capability at block 704, model integration layer 600 may be configured to determine a plurality of models configured to provide the capability, as indicated by block 706. Determining the plurality of models may involve searching a network associated with model integration layer 600 and/or one or more third-party networks to identify models that are configured to and available to provide the capability. In some implementations, the operations of blocks 706 and 704 may be reversed, with the models being identified before the capabilities are determined.

Determining the plurality of models may also involve defining, for a respective model of the plurality of models, an input data transformation between the capability-specific input data format and a model-specific input data format associated with the respective model, and/or an output data transformation between a model-specific output data format associated with the respective model and the capability-specific output data format. Such input and output data transformations may allow model integration layer 600 to provide a uniform interface, while allowing for implementation differences among models that provide a particular capability.

Based on and/or in response to determining the plurality of models at block 706, model integration layer 600 may be configured to determine a mapping for the plurality of models that provide the capability, as indicated by block 708. The mapping determined at block 708 may be the same as or similar to mapping 654. Thus, the mapping may indicate, for each respective model of the plurality of models, one or more attribute values that cause the respective model to be executed to provide the capability. Based on and/or in response to determination of the mapping at block 708, model integration layer 600 may be configured to enable the capability for one or more application builders, as indicated by block 710.

Application builder 602 may be configured to request, from model integration layer 600, a representation of available capabilities that are enabled for application builder 602, as indicated by arrow 712. Requesting the representation of available capabilities may involve transmitting, to an API provided by model integration layer 600, a first request addressed to a first URL and including a first parameter identifying application builder 602. Based on and/or in response to reception of the request at arrow 712, model integration layer 600 may be configured to provide, to application builder 602, the representation of the available capabilities, as indicated by arrow 714. For example, model integration layer 600 may be configured to retrieve from a database a list of capabilities that are enabled for application builder 602.

Based on and/or in response to reception of the representation of the available capabilities at arrow 714, application builder 602 may be configured to select the capability, as indicated by block 716. The capability may be selected, for example, by way of a user interface configured to display the available capabilities to a user of application builder 602. Alternatively or additionally, application builder 602 may be configured to select all of the available capabilities.

Based on and/or in response to selection of the capability at block 716, application builder 602 may be configured to request, from model integration layer 600, the definition of the capability, as indicated by arrow 718. Requesting the definition of the capability may involve transmitting, to the API provided by model integration layer 600, a second request addressed to a second URL and including a second parameter identifying the capability selected at block 716.

Based on and/or in response to reception of the request at arrow 718, model integration layer 600 may be configured to provide, to application builder 602, the definition of the capability, as indicated by arrow 720. For example, when a definition of capability 622 is requested at arrow 720, model integration layer 600 may be configured to provide a representation of at least input(s) 624, output(s) 626, and operation(s) 628 using, for example, XML, JAVASCRIPT® Object Notation (JSON), and/or another predefined format.

Application builder 602 may be configured to define a software application that includes the capability, as indicated by block 722. Application builder 602 may represent the capability using a graphical icon, which a user may manipulate to add the capability to the software application and interconnect the capability with other components of the software application. For example, application builder 602 may allow outputs of one or more preceding components of the software application to be provided as inputs to the capability, and output(s) of the capability to be provided as inputs to one or more subsequent components of the software application.

Based on and/or in response to defining the software application, application builder 602 may be configured to request, from model integration layer 600, a runtime configuration for the software application, as indicated by arrow 724. Requesting the runtime configuration may involve transmitting, to the API provided by model integration layer 600, a third request addressed to a third URL and including any parameters requested by model integration layer 600 as part of the definition of the capability. For example, the third request may include identifiers of the capability, the software application, and/or application builder 602, among other possibilities. Thus, the request for the runtime configuration may specify and/or facilitate determination of at least some of the attribute values that will be used at runtime to select a model to provide the capability.

Based on and/or in response to reception of the request of arrow 724, model integration layer 600 may be configured to generate the runtime configuration, as indicated by block 726. The runtime configuration may link the software application to one or more execution parameters for the capability. That is, when the software application requests performance of the capability, the runtime configuration may be accessed to determine the one or more execution parameters, and the capability may be executed in accordance with these one or more execution parameters. For example, the one or more execution parameters may indicate an amount of computing resources that model integration layer 600 is configured to utilize in providing the capability. In some implementations, the identifier of the runtime configuration may also operate as an authorization token that allows model integration layer 600 to determine whether a particular application is authorized to access a given capability.

Based on and/or in response to generation of the runtime configuration at block 726, model integration layer 600 may be configured to provide an identifier of the runtime configuration to application builder 602, as indicated by arrow 728. Based on and/or in response to reception of the identifier at arrow 728, application builder 602 may be configured to provide the identifier to the software application, as indicated by block 730. The identifier may be application-specific, and may thus be used by the software application to reference the runtime configuration when making requests for the capability.

Turning to FIG. 7B, software application 700 may represent the software application defined at block 722 of FIG. 7A. Software application 700 may be configured to provide, to model integration layer 600, a request for the capability, as indicated by arrow 732. The request for the capability may include input data for the capability and the identifier of the runtime configuration. The input data may be provided in the capability-specific input data format for the capability.

In some implementations, based on and/or in response to reception of the request at arrow 732, model integration layer 600 may be configured to return control to software application 700, as indicated by arrow 734. That is, software application 700 may be configured to operate asynchronously with respect to model integration layer 600 and/or model 702. In other implementations, model integration layer 600 may be configured to block software application 700 until output data for the requested capability is available. That is, software application 700 may be configured to operate synchronously with respect to model integration layer 600 and/or model 702, and may thus wait until output data is available before regaining control of at least the thread that made the request at arrow 732.

Based on and/or in response to reception of the request at arrow 732 and/or returning of control at arrow 734, model integration layer 600 may be configured to determine runtime attribute value(s), as indicated by block 736. The runtime attribute value(s) may include values for any of the attributes discussed with respect to FIG. 6. In some implementations, model integration layer 600 may be configured to use the identifier of the runtime configuration to determine at least some of the runtime attribute value(s), which may be stored as part of the runtime configuration for software application 700.

Additionally or alternatively, model integration layer 600 may be configured to use the identifier of the runtime configuration to determine whether software application 700 is authorized to use model integration layer 600 by determining whether the identifier corresponds to a valid runtime configuration defined using an application builder for which the capability is enabled. Accordingly, the runtime configuration and the identifier thereof may provide an added layer of control and/or security, and may prevent unauthorized applications from misusing and/or abusing the capabilities of model integration layer 600.

Based on and/or in response to determination of the runtime attribute value(s) at block 736, model integration layer 600 may be configured to select, based on the runtime attribute value(s), one or more models of the plurality of models available to execute the capability, as indicated by block 738. The one or more models selected at block 738 may include model 702. Based on and/or in response to selection of the one or more models at block 738, model integration layer 600 may be configured to provide, to model 702, the input data, as indicated by arrow 740. In cases where the input data is provided in the capability-specific input data format that differs from the model-specific input data format of model 702, model integration layer 600 may be configured to apply a corresponding input data transformation to the input data prior to providing the input data to model 702.

Based on and/or in response to reception of the input data, model 702 may be configure to execute to generate output data based on the input data, as indicated by block 742. Based on and/or in response to execution of the model at block 742, model 702 may be configured to provide the output data to model integration layer 600, as indicated by arrow 744.

In some implementations, two or more models may be selected at block 738. Accordingly, the operations of arrow 740, block 742, and arrow 744 may be repeated, as indicated by arrow 746, with respect to any remaining models. Model integration layer 600 may be configured to receive and combine corresponding output data from each respective model of the two or more models selected at block 738, and generate a final output data that represents a combination (e.g., average, median, minimum, maximum, etc.) of the corresponding output data from each respective model.

In some implementations, the request at arrow 732 may simultaneously specify multiple capabilities and indicate one or more dependencies among the multiple capabilities. For example, the request at arrow 732 may specify (i) a first capability along with input data therefor, (ii) a second capability configured to process an output data of the first capability, and (iii) a third capability along with input data therefor. Accordingly, execution of the second capability may be dependent on an output of the first capability, while the third capability may be executable independently of the first capability and the second capability. Alternatively or additionally, some multi-operation capabilities may be composed of two or more single-operations capabilities that are dependent on one another. Thus, model integration layer 600 may be configured to determine a dependency graph that represents one or more dependencies among the multiple capabilities requested at arrow 732, and may execute these capabilities in accordance with the dependency graph. Specifically, dependent capabilities may be executed serially in an order of the dependencies, while independent capabilities may be executed in parallel.

Based on and/or in response to reception of the output data at arrow 744 and/or combining the corresponding output data of two or more models, model integration layer 600 may be configured to provide, to software application 700, a model-independent representation of the output data, as indicated by arrow 748. In cases where the output data is provided by model 702 in the model-specific output data format that differs from the capability-specific output data format of model integration layer 600, model integration layer 600 may be configured to apply the output data transformation to the output data prior to providing the output data to software application 700.

In synchronous implementations where control was not returned to software application 700 at arrow 734, the model-independent representation of the output data may be provided as a response to the request at arrow 732. In asynchronous implementations where control was returned to software application 700 at arrow 734, the model-independent representation of the output data may be provided to a callback destination indicated by software application 700 for asynchronously handling the output data. For example, the callback destination may be specified as part of the runtime configuration, and/or as part of the request at arrow 732. Alternatively or additionally, model integration layer 600 may be configured to store the model-independent representation of the output data in a database, as indicated by block 750, where the model-independent representation of the output data may be accessible to software application 700 and/or other software applications.

VIII. EXAMPLE OPERATIONS

Figure 8:
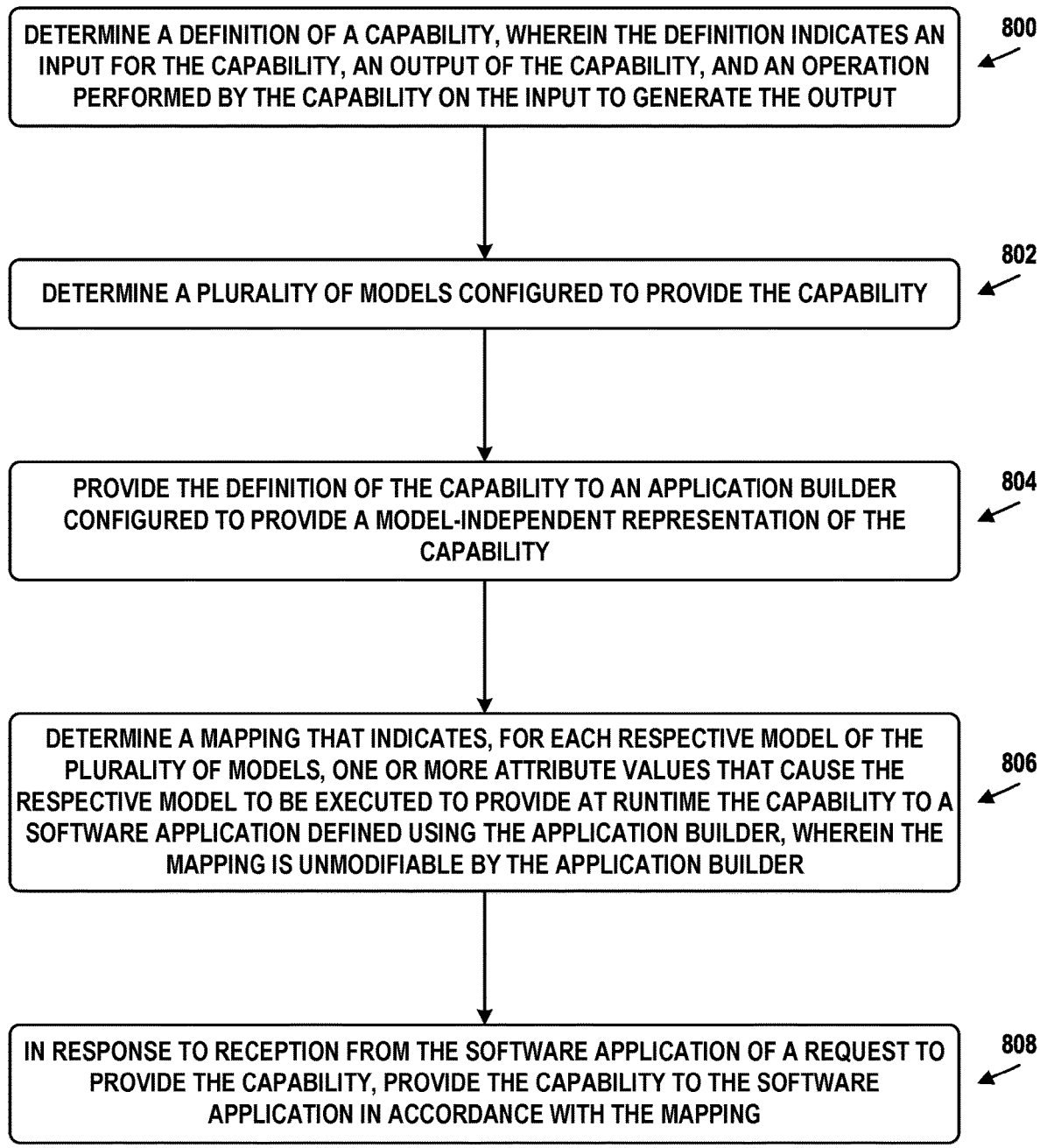
FIG. 8 is a flow chart, in accordance with example embodiments.
Figure 9:
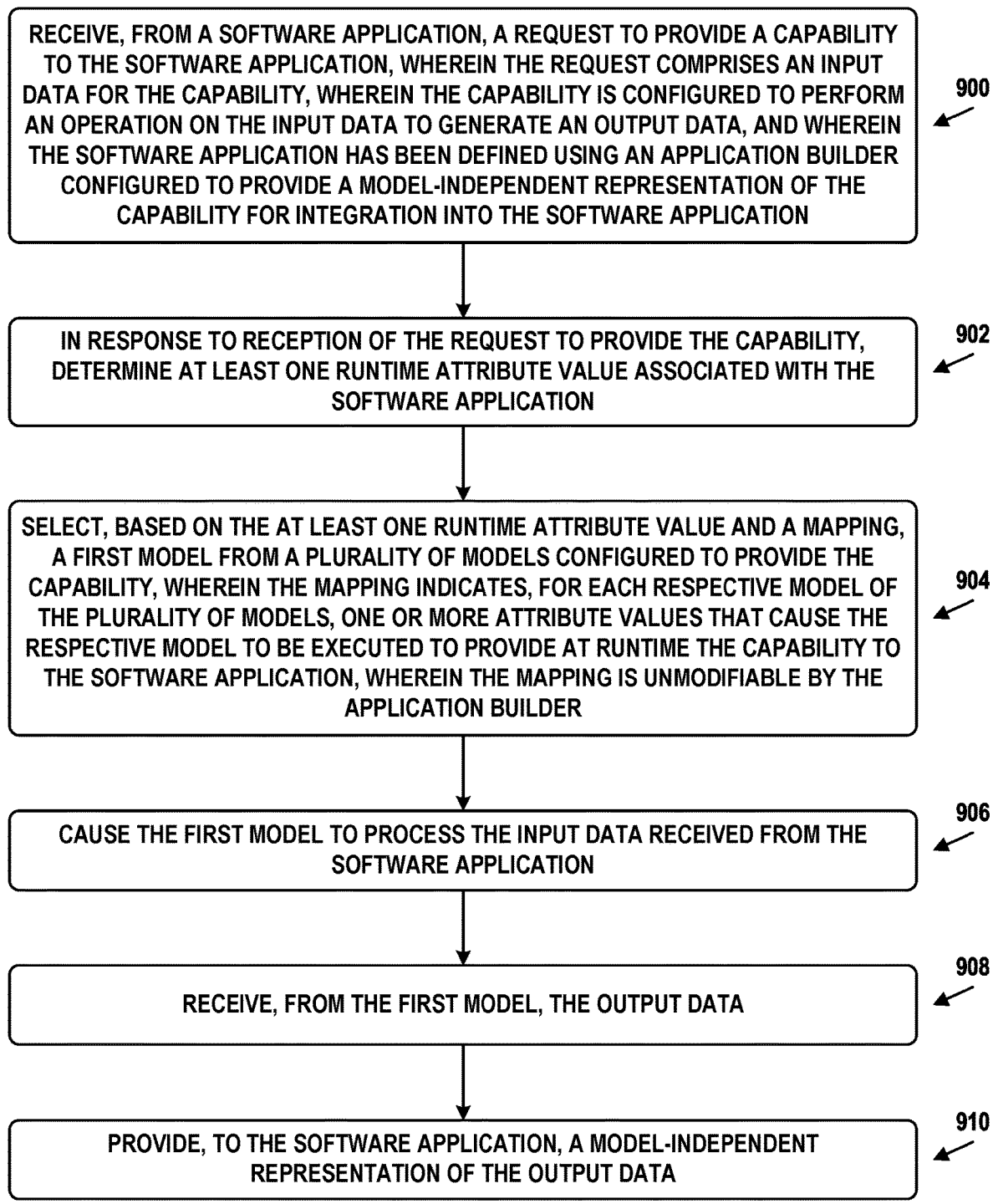
FIG. 9 is a flow chart, in accordance with example embodiments.

Each of FIG. 8 and FIG. 9 is a flow chart illustrating an example embodiment. The processes illustrated by FIGS. 8 and 9 may be carried out by a computing device, such as computing device 100, and/or a cluster of computing devices, such as server cluster 200. However, the processes can be carried out by other types of devices or device subsystems. For example, the processes could be carried out by a computational instance of a remote network management platform, a portable computer, such as a laptop or a tablet device, and/or model integration layer 600.

The embodiments of FIGS. 8 and 9 may be simplified by the removal of any one or more of the features shown therein. Further, these embodiments may be combined with features, aspects, and/or implementations of any of the previous figures or otherwise described herein.

Turning to FIG. 8, block 800 may involve determining a definition of a capability. The definition may indicate an input for the capability, an output of the capability, and an operation performed by the capability on the input to generate the output.

Block 802 may involve determining a plurality of models configured to provide the capability.

Block 804 may involve providing the definition of the capability to an application builder configured to provide a model-independent representation of the capability.

Block 806 may involve determining a mapping that indicates, for each respective model of the plurality of models, one or more attribute values that cause the respective model to be executed to provide at runtime the capability to a software application defined using the application builder. The mapping may be unmodifiable by the application builder.

Block 808 may involve, in response to reception from the software application of a request to provide the capability, providing the capability to the software application in accordance with the mapping.

In some embodiments, providing the definition of the capability to the application builder may include selecting, from a plurality of application builders, one or more application builders for which to enable the capability. The capability may be builder-independent. Each respective application builder of the plurality of application builders may be configured to provide a corresponding model-independent representation of the capability to allow for inclusion of the capability in a corresponding type of software application defined using the respective application builder. The definition of the capability may be provided to each respective application builder of the one or more application builders in accordance with a builder configuration that defines a format using which the respective builder is configured to receive integrations of additional capabilities.

In some embodiments, the application builder may be configured to provide a graphical user interface for defining the software application based on user manipulation of a plurality of graphical representations of a plurality of candidate operations performable by software applications. Reception of the definition of the capability may be configured to cause the application builder to add a graphical representation of the capability to the graphical user interface.

In some embodiments, determining the plurality of models may include determining, for a particular model of the plurality of models, a corresponding model-specific input for the particular model. The one or more attribute values for the particular model may indicate whether the corresponding model-specific input for the particular model is provided at runtime.

In some embodiments, the one or more attribute values may represent one or more of: (i) an identifier of the software application, (ii) an identifier of a user of the software application, (iii) an identifier of the application builder that has been used to define the software application, (iv) a quality of service level associated with the software application, (v) a target latency associated with the software application, (vi) a geographic location associated with the software application, or (vii) a utilization of computing resources at runtime.

In some embodiments, the plurality of models may include a plurality of different machine learning models each of which is configured to provide the capability.

In some embodiments, at least one model of the plurality of models may be hosted by a third-party network that is different from a network that hosts the application builder, or each of (i) the application builder and (ii) one or more models of the plurality of models may be hosted on a same network.

In some embodiments, the model-independent representation of the capability may describe the plurality of models using a single shared description of the capability. The single shared description may exclude description of differences among different models of the plurality of models.

In some embodiments, providing the capability to the software application mat include, in response to reception of the request to provide the capability, determining at least one runtime attribute value associated with the software application. The request to provide the capability may include an input data for the capability. A first model of the plurality of models may be selected based on the at least one runtime attribute value and the mapping. The first model may be caused to process the input data. An output data may be received from the first model. A model-independent representation of output data may be provided to the software application.

In some embodiments, selecting the first model may include selecting, based on the at least one runtime attribute value and the mapping, an ensemble of models that includes two or more models of the plurality of models. Causing the first model to process the input data may include causing each model of the ensemble of models to process the input data. Receiving the model-independent representation of the output data may include: (i) receiving corresponding output data from each model of the ensemble of models and (ii) determining, based on the corresponding output data from each model of the ensemble of models, a final output data. Providing the output data may include providing a model-independent representation of the final output data.

In some embodiments, control may be returned to the software application in response to reception of the request to provide the capability. Providing the model-independent representation of the output data may include, in response to receiving the output data from the first model, providing the model-independent representation of the output data to a callback destination indicated by the software application for asynchronously handling the output data.

In some embodiments, the software application may be configured to wait for the output data after transmitting the request to provide the capability. Providing the model-independent representation of the output data may include, in response to receiving the output data from the first model, providing the model-independent representation of the output data as a response to the request to provide the capability.

In some embodiments, control may be returned to the software application in response to reception of the request to provide the capability. Providing the model-independent representation of the output data may include, in response to receiving the output data from the first model, storing the model-independent representation of the output data in a database associated with the software application.

In some embodiments, providing the capability to the software application may include, in response to reception of the request to provide the capability, determining at least one runtime attribute value indicative of a runtime utilization of computing resources by each of the plurality of models. Providing the capability to the software application may also include selecting, based on the at least one runtime attribute value and the mapping, a first model of the plurality of models to be used for providing the capability to the software application. Selection of the first model may contribute to load balancing of requests for the capability across the plurality of models.

In some embodiments, providing the definition of the capability to the application builder may include receiving, from the application builder and by way of an application programming interface (API), a first request for identification of capabilities that are available for the application builder. Based on reception of the first request, a first response identifying a plurality of capabilities that is available for the application builder may be provided to the application builder and by way of the API. For each respective capability of the plurality of capabilities, a corresponding second request for a corresponding definition of the respective capability may be received from the application builder and by way of the API. For each respective capability of the plurality of capabilities, based on reception of the corresponding second request, a corresponding second response comprising a corresponding definition of the respective capability may be provided to the application builder and by way of the API. The corresponding definition may indicate (i) a corresponding input for the respective capability, (ii) a corresponding output of the respective capability, and (iii) a corresponding operation performed by the respective capability on the corresponding input to generate the corresponding output.

In some embodiments, a request for generation of a runtime configuration for the software application may be received from the application builder and by way of an API. The runtime configuration may link the software application to one or more execution parameters for the capability. The runtime configuration may be generated for the software application. An identifier of the runtime configuration for the software application may be transmitted to the application builder and by way of the API. Providing the capability to the software application may include receiving, from the software application and by way of the API, the identifier associated with the runtime configuration, and executing the capability based on the one or more execution parameters.

In some embodiments, the capability may be one of a plurality of capabilities provided to the application builder and included in the software application. Providing the capability to the software application may include receiving, from the software application, a request to execute two or more capabilities of the plurality of capabilities, determining one or more dependencies among the two or more capabilities, and executing the two or more capabilities in an order based on the one or more dependencies.

In some embodiments, determining the plurality of models may include determining, for a respective model of the plurality of models, (i) an input data transformation between a capability-specific input data format of the input for the capability and a model-specific input data format of the respective model, and (ii) an output data transformation between a model-specific output data format of the respective model and a capability-specific output data format of the output. Providing the capability to the software application may include applying the input data transformation to input data received from the software application prior to providing the input data to the respective model, and applying the output data transformation to output data received from the respective model.

Turning to FIG. 9, block 900 may involve receiving, from a software application, a request to provide a capability to the software application. The request may include an input data for the capability. The capability may be configured to perform an operation on the input data to generate an output data. The software application may have been defined using an application builder configured to provide a model-independent representation of the capability for integration into the software application.

Block 902 may involve, in response to reception of the request to provide the capability, determining at least one runtime attribute value associated with the software application.

Block 904 may involve selecting, based on the at least one runtime attribute value and a mapping, a first model from a plurality of models configured to provide the capability. The mapping may indicate, for each respective model of the plurality of models, one or more attribute values that cause the respective model to be executed to provide at runtime the capability to the software application. The mapping may be unmodifiable by the application builder.

Block 906 may involve causing the first model to process the input data received from the software application.

Block 908 may involve receiving, from the first model, the output data.

Block 910 may involve providing, to the software application, a model-independent representation of the output data.

As noted, the features of any previously-described embodiment, including those relating to FIG. 8, can be integrated with the features of FIG. 9 in various ways.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

What is claimed is:

1. A method comprising:
   determining a definition of a capability, wherein the definition indicates an input for the capability, an output of the capability, and an operation performed by the capability on the input to generate the output;
   determining a plurality of models configured to provide the capability;
   providing the definition of the capability to an application builder configured to provide a model-independent representation of the capability, wherein providing the definition of the capability to the application builder comprises:
      receiving, from the application builder and by way of an application programming interface (API), a request for identification of capabilities that are available for the application builder;
      based on reception of the request for identification of the capabilities that are available for the application builder, providing, to the application builder and by way of the API, one or more responses that identify and define one or more capabilities that are available for the application builder;
   determining a mapping that indicates, for each respective model of the plurality of models, one or more attribute values that cause the respective model to be executed to provide at runtime the capability to a software application defined using the application builder, wherein the mapping is unmodifiable by the application builder; and
   in response to reception from the software application of a request to provide the capability, providing the capability to the software application in accordance with the mapping.

2. The method of claim 1, wherein providing the definition of the capability to the application builder comprises:
   selecting, from a plurality of application builders, one or more application builders for which to enable the capability, wherein the capability is builder-independent, and wherein each respective application builder of the plurality of application builders is configured to provide a corresponding model-independent representation of the capability to allow for inclusion of the capability in a corresponding type of software application defined using the respective application builder; and
   providing, to each respective application builder of the one or more application builders, the definition of the capability in accordance with a builder configuration that defines a format using which the respective builder is configured to receive integrations of additional capabilities.

3. The method of claim 1, wherein the application builder is configured to provide a graphical user interface for defining the software application based on user manipulation of a plurality of graphical representations of a plurality of candidate operations performable by software applications, and wherein reception of the definition of the capability is configured to cause the application builder to add a graphical representation of the capability to the graphical user interface.

4. The method of claim 1, wherein determining the plurality of models comprises:
   determining, for a particular model of the plurality of models, a corresponding model-specific input for the particular model, wherein the one or more attribute values for the particular model indicate whether the corresponding model-specific input for the particular model is provided at runtime.

5. The method of claim 1, wherein the one or more attribute values represent one or more of: (i) an identifier of the software application, (ii) an identifier of a user of the software application, (iii) an identifier of the application builder that has been used to define the software application, (iv) a quality of service level associated with the software application, (v) a target latency associated with the software application, (vi) a geographic location associated with the software application, or (vii) a utilization of computing resources at runtime.

6. The method of claim 1, wherein the plurality of models comprises a plurality of different machine learning models each of which is configured to provide the capability.

7. The method of claim 1, wherein the model-independent representation of the capability describes the plurality of models using a single shared description of the capability, and wherein the single shared description excludes description of differences among different models of the plurality of models.

8. The method of claim 1, wherein providing the capability to the software application comprises:
   in response to reception of the request to provide the capability, determining at least one runtime attribute value associated with the software application, wherein the request to provide the capability comprises an input data for the capability;
   selecting, based on the at least one runtime attribute value and the mapping, a first model of the plurality of models;
   causing the first model to process the input data;
   receiving, from the first model, an output data; and
   providing, to the software application, a model-independent representation of the output data.

9. The method of claim 8, wherein:
   selecting the first model comprises selecting, based on the at least one runtime attribute value and the mapping, an ensemble of models comprising two or more models of the plurality of models;
   causing the first model to process the input data comprises causing each model of the ensemble of models to process the input data;
   receiving the output data comprises: (i) receiving corresponding output data from each model of the ensemble of models and (ii) determining, based on the corresponding output data from each model of the ensemble of models, a final output data; and
   providing the model-independent representation of the output data comprises providing a model-independent representation of the final output data.

10. The method of claim 8, wherein control is returned to the software application in response to reception of the request to provide the capability, and wherein providing the model-independent representation of the output data comprises:
   in response to receiving the output data from the first model, providing the model-independent representation of the output data to a callback destination indicated by the software application for asynchronously handling the output data.

11. The method of claim 8, wherein the software application is configured to wait for the output data after transmitting the request to provide the capability, and wherein providing the model-independent representation of the output data comprises:

in response to receiving the output data from the first model, providing the model-independent representation of the output data as a response to the request to provide the capability.

12. The method of claim 8, wherein control is returned to the software application in response to reception of the request to provide the capability, and wherein providing the model-independent representation of the output data comprises:

in response to receiving the output data from the first model, storing the model-independent representation of the output data in a database associated with the software application.

13. The method of claim 1, wherein providing the capability to the software application comprises:

in response to reception of the request to provide the capability, determining at least one runtime attribute value indicative of a runtime utilization of computing resources by each of the plurality of models; and selecting, based on the at least one runtime attribute value and the mapping, a first model of the plurality of models to be used for providing the capability to the software application, wherein the selection of the first model contributes to load balancing of requests for the capability across the plurality of models.

14. The method of claim 1, wherein the one or more responses comprise:

for each respective capability of the one or more capabilities, a corresponding definition of the respective capability, wherein the corresponding definition indicates (i) a corresponding input for the respective capability, (ii) a corresponding output of the respective capability, and (iii) a corresponding operation performed by the respective capability on the corresponding input to generate the corresponding output.

15. The method of claim 1, further comprising:

receiving, from the application builder and by way of the API, a request for generation of a runtime configuration for the software application, wherein the runtime configuration links the software application to one or more execution parameters for the capability;

generating the runtime configuration for the software application;

transmitting, to the application builder and by way of the API, an identifier of the runtime configuration for the software application, wherein providing the capability to the software application comprises:

receiving, from the software application and by way of the API, the identifier associated with the runtime configuration; and executing the capability based on the one or more execution parameters.

16. The method of claim 1, wherein the capability is one of a plurality of capabilities provided to the application builder and included in the software application, and wherein providing the capability to the software application comprises:

receiving, from the software application, a request to execute two or more capabilities of the plurality of capabilities;

determining one or more dependencies among the two or more capabilities; and executing the two or more capabilities in an order based on the one or more dependencies.

17. The method of claim 1, wherein determining the plurality of models comprises:

determining, for a particular model of the plurality of models, (i) an input data transformation between a capability-specific input data format of the input for the capability and a model-specific input data format of the particular model, and (ii) an output data transformation between a model-specific output data format of the particular model and a capability-specific output data format of the output, wherein providing the capability to the software application comprises:

applying the input data transformation to input data received from the software application prior to providing the input data to the particular model; and applying the output data transformation to output data received from the particular model.

18. The method of claim 1, wherein:

the one or more capabilities comprise a plurality of capabilities;

the request for identification of capabilities comprises a first request for identification of the capabilities that are available for the application builder;

the one or more responses comprise a first response that (i) identifies the plurality of capabilities that is available for the application builder and (ii) is provided to the application builder based on reception of the first request;

the request for identification of capabilities comprises, for each respective capability of the plurality of capabilities identified by the first response, a corresponding second request for a corresponding definition of the respective capability; and the one or more responses comprise a corresponding second response that (i) includes the corresponding definition of the respective capability and (ii) is provided to the application builder based on reception of the corresponding second request.

19. A non-transitory computer-readable medium, having stored thereon program instructions that, upon execution by a computing system, cause the computing system to perform operations comprising:

determining a definition of a capability, wherein the definition indicates an input for the capability, an output of the capability, and an operation performed by the capability on the input to generate the output;

determining a plurality of models configured to provide the capability;

providing the definition of the capability to an application builder configured to provide a model-independent representation of the capability, wherein providing the definition of the capability to the application builder comprises:

receiving, from the application builder and by way of an application programming interface (API), a request for identification of capabilities that are available for the application builder;

based on reception of the request for identification of the capabilities that are available for the application builder, providing, to the application builder and by way of the API, one or more responses that identify and define one or more capabilities that are available for the application builder;

determining a mapping that indicates, for each respective model of the plurality of models, one or more attribute values that cause the respective model to be executed to provide at runtime the capability to a software application defined using the application builder, wherein the mapping is unmodifiable by the application builder; and in response to reception from the software application of a request to provide the capability, providing the capability to the software application in accordance with the mapping.

20. A system comprising a processor configured to perform operations comprising:

determining a definition of a capability, wherein the definition indicates an input for the capability, an output of the capability, and an operation performed by the capability on the input to generate the output;

determining a plurality of models configured to provide the capability;

providing the definition of the capability to an application builder configured to provide a model-independent representation of the capability, wherein providing the definition of the capability to the application builder comprises:

receiving, from the application builder and by way of an application programming interface (API), a request for identification of capabilities that are available for the application builder;

based on reception of the request for identification of the capabilities that are available for the application builder, providing, to the application builder and by way of the API, one or more responses that identify and define one or more capabilities that are available for the application builder;

determining a mapping that indicates, for each respective model of the plurality of models, one or more attribute values that cause the respective model to be executed to provide at runtime the capability to a software application defined using the application builder, wherein the mapping is unmodifiable by the application builder; and in response to reception from the software application of a request to provide the capability, providing the capability to the software application in accordance with the mapping.

* * * * *